Patented Feb. 28, 1939

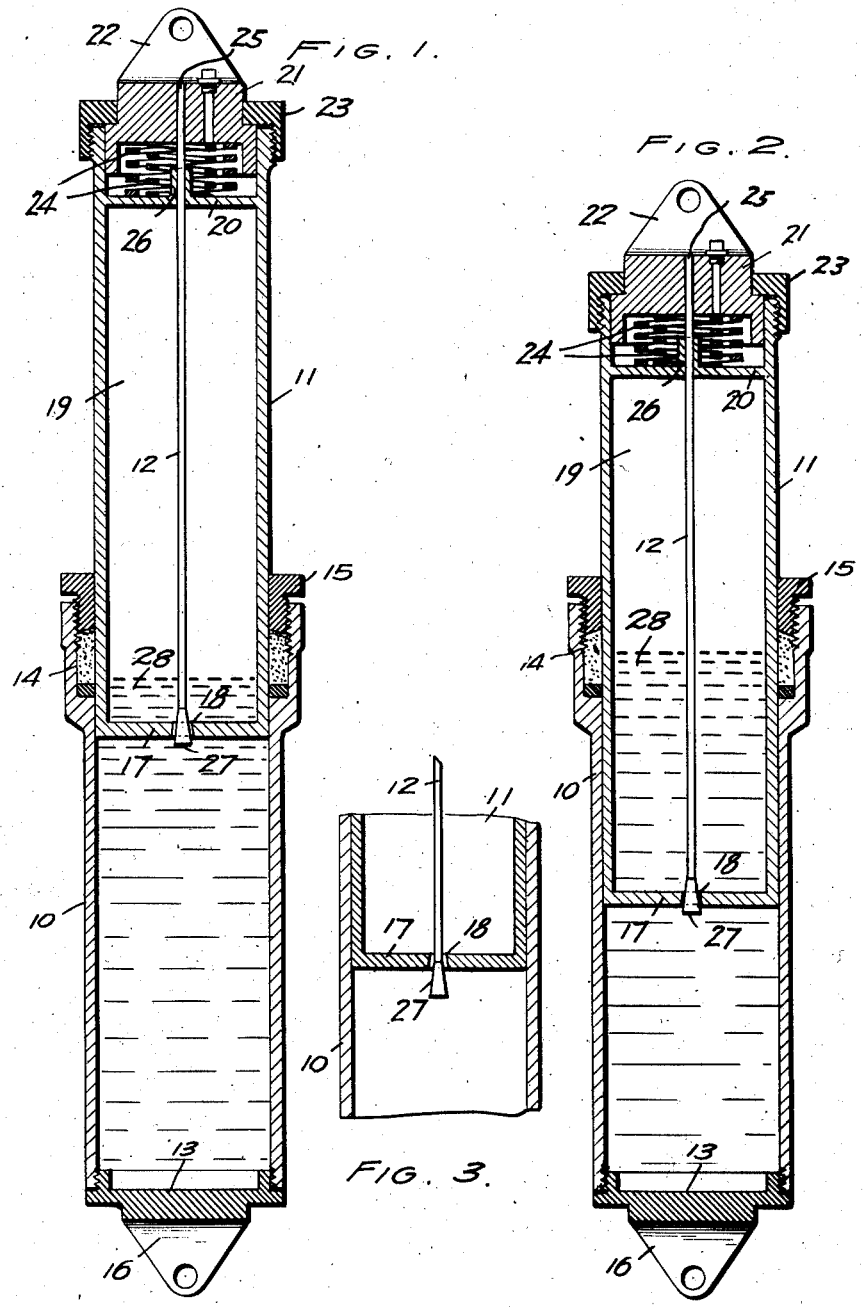

2,148,497

UNITED STATES PATENT OFFICE 2,148,497

SHOCK ABSORBER

William C. Peck, Washington, D. C.

Application November 10, 1937, Serial No. 173,843

6 Claims. (Cl. 188—88)

(Granted under the act of March 3, 1883, as amended April 30, 1928; 370 O. G. 757)

The invention described herein may be manufactured and used by or for the Government for governmental purposes, without the payment to me of any royalty thereon.

The general design of the present conventional hydraulic shock-absorbers is such that but one condition of operation may be considered in the basic design. The working requirements usually selected for the basis are the most severe expected, leaving the requirements between the least and the most severe without adequate consideration in the design.

The operation of the conventional shock-absorber strut on a vehicular or an airplane chassis is also partially dependent upon the unsprung weight and geometric arrangements of the chassis and the characteristics of the tire used. This further limits the satisfactory action of the conventional shock-absorber to the type of chassis and tire considered in the basis of design.

Recognition of the need for a shock-absorbing strut, whose operation would approach the criterion of offering a constant retarding force throughout its contraction stroke when subjected to a variety of operating conditions, has lead to the conception of the hereinafter described hydraulic shock-absorber.

Hence, the primary object of the present invention is to provide a shock-absorbing mechanism that will (1) absorb energy and while so doing transmit a sensibly constant retarding force to the structure on which it is mounted, (2) absorb impacts and while so doing transmit a minimum force to the structure on which it is mounted, and (3) offer a retarding force whose magnitude is a function of the rate of the relative motion between the piston and the cylinder of the shock absorber.

Another object of the invention is to provide a shock absorber mechanism the operation of which is (1) independent of the effects of the unsprung mass of the chassis on which it is mounted, (2) sensibly independent of the effects of the characteristics of the tire used with the chassis on which the shock absorber is mounted; and (3) readily adjustable so that regulation of the magnitude of the retarding force may easily be made.

A further object of the invention is to provide a shock-absorbing mechanism in the design of which the complete range of working conditions may be given equal consideration.

A still further object of the invention is to provide a shock-absorbing mechanism that will be readily interchangeable—and function efficiently—on different types of aircraft or vehicles of sensibly the same weight.

With the above and other objects in view, the invention consists in the novel construction, combination, and arrangement of parts hereinafter more fully described with reference to the accompanying drawing, wherein:

Figure 1 is a longitudinal sectional view of a shock absorber embodying the invention and shown in completely extended condition;

Figure 2 is a similar sectional view of the shock absorber in a state of partial collapse; the metering pin being in the same relative position with respect to the plunger head as shown in Figure 1, and Figure 3 is a detail sectional view illustrating a change in the relative position of the metering pin with respect to the plunger head.

The herein described shock absorber strut consists essentially of a main cylinder 10 adapted to contain an incompressible fluid medium, such as oil; a spring-loaded smaller cylinder 11 slidable in the main cylinder and constituting a piston or plunger; and a metering pin 12. The cylinder 10 is closed at its outer or bottom end by an end fitting 13 and is provided at its inner or upper end with a packing box 14 and packing gland ring nut 15. The cylinder 10 is adapted to be attached to an airplane landing gear chassis by suitable means, such as a clevis 16 forming an integral part of the cylinder-end fitting 13. The piston 11 has its lower end or head 17 provided with a leak orifice 18 through which when the piston is forced into the cylinder the oil passes into the piston chamber 19, the latter being closed at its upper end by a wall 20 forming an integral part of the piston and spaced inwardly of the piston-end fitting 21. The fitting 21 is provided with suitable means, such as a clevis 22, for attachment to an airplane main structure or fuselage and is a sliding fit in the piston. It is prevented from being forced out of the piston by means of a ring nut 23 screwed on the end of the piston and engaging over a shoulder on the fitting. A set of springs 24 is chambered under an initial compressive load in the piston between the piston-end fitting 21 and the piston restraining wall 20. The piston 11 floats between the fluid in the cylinder 10 and the set of springs 24. The metering pin 12 is rigidly secured at one end 25 to the piston-end fitting 21 and extends downwardly into the piston 11, through the journal 26 of the piston restraining wall 20, with its free end 27 terminating in the piston-head orifice 18. The mechanical connection between the piston 11 and the metering pin 12 is such that their motion relative to the cylinder 10 is sensibly as one unit. Relative motion between the metering pin and the piston is, however, possible but is restricted by means of the springs 24. The free end 27 of the metering pin is shaped (tapered) so that relative motion between the pin and the piston causes a change in the effective area of the piston-head orifice 18, as will be noted from a comparison of Figure 1 and Figure 3.

The relative position of the metering pin 12 with respect to the plunger head 17 is a function of the degree of compression of the internal springs 24 in the upper end of the piston or plunger. The compression of these springs is a function of the force with which the strut resists closure: hence, the relative position of the metering pin is a function of the load tending to collapse the strut. Regulation of the initial compressive load on the springs 24, the shape (taper) of the free end 27 of the metering pin, and the size of the orifice 18 in the piston head will control the action of the shock-absorbing mechanism under various rates of closure (rates of relative motion between the cylinder 10 and the piston 11) of the shock absorber.

Operation of the shock absorber: The cylinder 10 is filled with oil to such a height that, with the shock absorber completely extended, the piston head 17 is submerged. When closure of the shock absorber occurs, the oil is forced from the cylinder through the piston-head orifice 18 into the piston 11 and the orifice characteristics determine the force with which the shock absorber resists closure. When this resisting force (approximately equal to the force causing closure of the shock absorber) exceeds the initial compressive loads on the springs 24, relative motion between the metering pin 12 and the piston 11 occurs. This relative motion changes the effective orifice characteristics and results in a change in the force resisting closure. The direction of this change in resisting force and magnitude can be controlled in the design of the shock absorber. When the force causing closure falls below the initial compressive force on the springs 24, the metering pin and the piston return to their initial relative position illustrated in Figures 1 and 2. In this position, the effective orifice characteristics are such that the shock absorber will effectively snub any tendency to cause rebound.

From the foregoing it will be seen that the invention provides a novel construction and design of shock absorber that will allow consideration of the entire working range of requirements and will eliminate to a large degree the influence of the chassis and the tire characteristics on the operation of the shock absorbing mechanism. Thus, with this improved type of shock absorber it will be possible to provide more efficient shock-absorption in the range usually encountered as well as meeting the requirements of the severest conditions. Also, this shock absorber will allow the use of various types of chassis and tires without influence on its design.

It is to be understood that the above description and the accompanying drawing correspond only to the general and preferred embodiment of the invention and that various changes in construction, proportion, and arrangements of parts may be made within the scope of the appended claims.

Having thus described the invention, I claim:

1. A shock absorber comprising a cylinder, a hollow piston slidable in the cylinder and having an orifice in the head thereof, a piston-end fitting slidable in the said hollow piston, a set of springs chambered under an initial compressive load between the piston and the piston-end fitting, a metering pin rigidly secured at one end to the piston-end fitting and extending into the piston with its free end terminating in the piston-head orifice, and means for connecting the said cylinder and the said piston-end fitting respectively to the parts whose movements are to be cushioned.

2. A shock absorber comprising a main cylinder, a smaller cylinder slidable in the main cylinder and having an orifice in the head thereof, a shouldered cylinder-end fitting slidable in the smaller cylinder, a ring nut screwed on the end of the piston and engaged over the shoulder of the ring nut, cylinder-closing means forming an integral part of the smaller cylinder and closing the outer end of the latter in inwardly spaced relation to the cylinder-end fitting, a set of springs chambered under an initial compressive load in the space between the cylinder-end fitting and the cylinder closing means, a metering pin rigidly secured at one end to the cylinder-end fitting and extending into the smaller cylinder with its free end cooperating with the said orifice, and means for connecting the said main cylinder and the said end-fitting of the smaller cylinder respectively to the parts whose movements are to be cushioned.

3. A shock absorber comprising a cylinder, a piston slidable in the cylinder and having an orifice in the head thereof, a piston-end fitting slidable in the piston, a metering pin carried by said piston-end fitting and cooperating with said orifice and a spring system mounted between said piston and said piston-end fitting so as to transfer to the piston end fitting the force with which the piston resists inward motion into the cylinder and, in addition, to control the relative positions of the metering pin and the orifice.

4. A shock absorber comprising a cylinder adapted to contain a liquid and having means of attachment to a part to be cushioned, a member having means of attachment to another part to be cushioned, a piston slidable in the cylinder and loosely coupled to the said member for limited sliding movement upwardly and downwardly with respect thereto, said piston having an orifice, an elastic body in compression between the member and the piston for yieldably holding the piston at the limit of its downward movement relative to the member and for transmitting to the said member the force resisting inward motion of the piston into the cylinder, and a metering pin carried by the said member and cooperating with the orifice of the piston to substantially reduce the effective orifice area when the piston is at the limit of its downward movement relative to the member and to progressively increase the effective orifice area during the entire upward movement of the piston relative to the member.

5. A shock absorber comprising a cylinder adapted to contain a liquid and having means of attachment to a part to be cushioned, a member having means of attachment to another part to be cushioned, a piston slidable in the cylinder and loosely coupled to the said member for limited movement upwardly and downwardly with respect thereto, said piston having an orifice, spring means chambered between the member and the piston and providing a spring force effective to position and to hold the piston at the limit of its downward movement relative to the member whenever the force causing closure of the shock absorber is less than the said spring force, and a metering pin fixed to the said member and cooperating with the orifice of the piston to substantially reduce the effective area of the said orifice when the piston is positioned at the limit of its downward movement relative to the member and to progressively increase the effective area of the orifice during the upward movement of the piston relative to the member.

6. A shock absorber comprising a cylinder adapted to contain a body of liquid, and having means of attachment to a part to be cushioned, a piston slidable in the cylinder and having two non-communicating chambers serving as a spring-receiving chamber and a liquid-receiving chamber respectively, the said latter chamber having an orifice to permit the flow of liquid into and out of the said chamber, a member having means of attachment to another part to be cushioned and extending into the said spring chamber, said piston and said member being interconnected to have limited relative movement toward and away from each other, spring means arranged in the spring chamber to provide a spring load between the piston and the member effective to maintain the latter at the limit of their relative movement away from each other whenever the force causing closure of the shock absorber is less than the said spring load, and a metering pin fixed to said member and cooperating with the orifice of the liquid chamber to change the effective area of the orifice upon motion of the said piston relative to the said member.

WILLIAM C. PECK.